US006548570B1

(12) United States Patent
Lange

(10) Patent No.: US 6,548,570 B1
(45) Date of Patent: Apr. 15, 2003

(54) METHOD FOR MANUFACTURING A RADIATION SHIELDING MATERIAL

(75) Inventor: Wolfgang Lange, Bad Driburg (DE)

(73) Assignee: Arntz Beteiligungs GmbH & Co. KG, Hoxter (DE)

( * ) Notice: Subject to any disclaimer, the term of this patent is extended or adjusted under 35 U.S.C. 154(b) by 0 days.

(21) Appl. No.: 09/713,219

(22) Filed: Nov. 16, 2000

(30) Foreign Application Priority Data

Nov. 16, 1999 (DE) .......................... 199 55 192

(51) Int. Cl.$^7$ .............................. G21K 1/10; C08K 3/10; C08K 9/02; C08J 3/20
(52) U.S. Cl. ..................... 523/137; 523/138; 523/205; 523/351; 524/434; 524/439
(58) Field of Search .................. 523/137, 348, 523/351, 205; 524/434, 439

(56) References Cited

U.S. PATENT DOCUMENTS

| 4,563,494 A | 1/1986 | Ida |
| 5,247,182 A | 9/1993 | Servant et al. |
| 5,278,219 A | 1/1994 | Lilley et al. |
| 5,908,884 A * | 6/1999 | Kawamura et al. |

FOREIGN PATENT DOCUMENTS

| EP | 0 371 699 | 6/1990 |

* cited by examiner

Primary Examiner—Tae H. Yoon
(74) Attorney, Agent, or Firm—Burns, Doane, Swecker & Mathis, LLP

(57) ABSTRACT

A radiation shielding material is manufactured from an elastomer that is blended with a radiation-absorbing filler material. The filler material comprises a powder of a metal with a high atomic member, or compounds thereof. The filler material is represented by more than 80 percent weight and has a grain size distribution in the range of 20 $\mu$m to 120 $\mu$m. The filler material is mixed with a loading material in powdered form. That mixture is kneaded with the elastomer within a mixer while the temperature is maintained below 180° C. The kneaded mixture is cooled and then cut into strips. The strips are passed through a strainer having a mesh width of between 5 $\mu$m and 1000 $\mu$m. The strained strips are then formed into a foil.

20 Claims, No Drawings

METHOD FOR MANUFACTURING A RADIATION SHIELDING MATERIAL

BACKGROUND OF THE INVENTION

The invention relates to a method for producing a radiation shielding material, in particular from a polymer that is mixed with a filler material.

Radiation shielding materials protect especially radiology technicians in medical and technical professions from undesired radiation exposure. Used as shielding materials are elastic substances that are mixed with elements with high atomic numbers or compounds thereof and that can be processed into protective clothing because of their elastic properties. Lead is added to these materials in order to absorb the X-ray radiation; however, the good radiation absorption properties of lead are disadvantageously offset by its toxicity.

Servant et al. U.S. Pat. No. 5,247,182 describes a shielding material that is worked into an apron. Said apron, attached to the body of the patient who is to be examined using fastening devices, is regarded as cumbersome because it is very heavy.

Lilley et al. U.S. Pat. No. 5,278,219 describes a flexible compound with a high filler content consisting of a synthetic thermoplastic elastomer. For example, vinyl acetate or blends with copolymers with ethylene/propylene elastomers can be mixed with radiation absorbing fillers, copper, lead, tin, tungsten, lead sulfide or mixtures thereof; the filler material represents at least 90 weight percent. This filler material is available in the form of a powder with grain sizes of between 38 μm and 150 μm. Grain size distribution and particle form are important parameters for achieving the desired flexibility with the maximum amount of filler material. However, this patent does not disclose the necessary steps for avoiding the lumping together of the metallic filler material or how to ensure its homogenous distribution within the elastomer.

Finally, U.S. Pat. No. 4,563,494 describes a compound consisting of a synthetic elastomer (on the basis of methacrylate with added boron); lead is added for radiation protection, and boron is added for improving the neutron protection. In addition, this patent describes the method for manufacturing the compound.

The content of U.S. Pat. No. 4,563,494 also provides that lead be replaced with rare earth metals; at least one of the rare earth metals is used as a compound, preferably in the form of oxides, hydroxides, salts of inorganic or organic acids and complex compounds. For production purposes the compounds, which contain at least one rare earth metal, are dissolved or dispersed in an elastomer binding material from the group with at least one vinyl monomer, selected from among a group consisting of acrylic acid or methacrylic acid or their esters, styrene and substituted styrene compounds; this preparation is then mixed with another co-polymerizable vinyl monomer and finally with a partially polymerized product thereof, and polymerized. These lanthanide compounds are added to the elastomer in a dough-like form, then finely and homogeneously dispersed, which is possible with low-viscosity elastomers, such as PVC. However, this patent does not disclose how such compounds can be added in a finely dispersed and homogeneous manner if the elastomer is not a low-viscosity elastomer.

European Document 0 371 699 proposes a lighter material with equivalent radiation absorption properties, preferably in the range of high-energy radiation to reduce the weight of the protective clothing in contrast to the traditional lead or lead vinyl aprons. Serving as a basic material is a polymer that contains 7 to 30 weight percent of a polar elastomer, 0 to 15 weight percent of a flexibilizer and 70 to 93 weight percent of an inorganic compound for absorbing the radiation. The latter consists of at least two elements or of compounds thereof that are adjusted in terms of the energy range, with lead providing the highest level of protection. Thermoplastic materials are listed as suitable polymers, in particular copolymers of ethylene with at least one partner of vinyl acrylate, alkyl acrylate, alkyl methacrylate, glycidyl methacrylate, acrylic acid, methacrylic acid, mixtures thereof, ionomers of such copolymers that are composed of one of the previously referred to monomers and ethylenized, unsaturated carboxylic acid and carboxylic anhydrides and other derivatives thereof. The polymeric base material should have a "flexural module" (ASTM D-790) in the range of 1 MPa to 100 MPa. Suitable inorganic components for absorbing the radiation are elements with higher atomic numbers, such as actinoids, antimony, barium, bismuth, bromine, cadmium, cerium, cesium, gold, iodine, indium, iridium, lanthanide, lead, mercury, molybdenum, osmium, platinum, polonium, rhenium, rhodium, silver, strontium, tantalum, thorium, tin, tungsten, uranium and zircon.

The amount for each of these two elements is at least 5 weight percent. When selecting the elements, their respective absorption capacities are taken into consideration to ensure that their absorption properties complement each other, at least in the range of the radiation spectrum from 10 keV to 200 keV. The specific mass is to be calculated in such a way that the lead equivalent of 0.1 mm is achieved. The density of the filler material is between 2.8 g/cm$^3$ and 6.5 g/cm$^3$. The components are placed into a melting-mixer apparatus or into a similar device (for example, a two roller mixer apparatus, a Banbury mixer, a Farrel mixer, a Buss kneader, a Gelimat mixer or a similar apparatus) in order to effect the assemblage. The mixture is then brought into the desired shape, in particular by way of extruding, calendering, compression molding, etc. In compounds with a high metal content it is difficult to produce a homogenous mixture, therefore, in such instances it is necessary to employ intensively working mixing aggregates. It can be advantageous if concentrated mixtures of the polymer with a flexibilizer and/or the (metallic) fillers are initially produced which are subsequently "diluted" by adding polymer, a process which cannot be used in connection with tin containing mixtures.

It is disadvantageous, though, that in particular metallic fillers cannot be blended with the polymers and provide sufficient homogeneity; obviously, these problems are caused by the differences in densities and the clumping tendency of these fillers. These difficulties complicate the economical manufacturing of radiation shielding materials to the point of impossibility. The previously referred to patent documents do not disclose how mixtures containing lead replacement materials can be manufactured economically on an industrial scale in ways that make these replacement materials available in fine and even distributions.

Based on this state of the art, the object of the present invention is, therefore, to develop a method that will allow the economical manufacturing of a radiation shielding material with homogenous distribution of the radiation-absorbing components on an industrial scale.

PREFERRED EMBODIMENT OF THE INVENTION

As described below, a radiation shielding material is made from a polymer that is blended with a radiation-absorbing filler material.

Advantageously used as a polymer is a thermoplastic, vulcanizable elastomer, known in the art from European Document 0 371 699, such as natural rubber (NR) and/or polychloroprene (CR) and/or mitrile-butadiene (NBR) and/or styrene-butadiene rubber (SBR) and/or butadiene rubber (BR) and/or ethylene propylene terpolymer (EPDM) and/or ethylene propylene copolymer (FPM) and/or polyurethane (PU) and/or isobutylene-isoprene rubber ([IIR]CSM) and/or silicone rubber (VMO and MQ) and/or ethylene vinyl acetate rubber (EVA) and/or blends thereof, or a non-vulcanizing elastomer, such as polypropylene/EPDM (PP/EPDM) and/or styrene-ethylene-butylene-styrene (SEBS) and/or polyvinyl-chloride-nitrile-butadiene (NBR/PVC) and/or ethylene propylene copolymer (EPM) and/or blends thereof.

A powder of a metal with a high atomic number or a compound thereof representing more than 80 weight percent is added to this elastomer as a radiation absorbing filler material. These are also known in the art from EP 0 371 699 and comprise antimony, barium, bismuth, bromine, cadmium, cerium, cesium, gold, iodine, indium, iridium, lead, mercury, molybdenum, osminium, platinum, polonium, rhenium, rhodium, silver, strontium, tantalum, thorium, tin, tungsten, uranium, zircon, elements from the lanthanide group and elements from the actinide group. The grain size distribution of this powder is in the range of between 20 $\mu$m and 120 $\mu$m.

Added to this powder are loading materials, also in powdered form. Envisioned suitable loading materials are magnesium aluminum silicate, zinc stearate, silicone resin powder, strontium carbonate, barium carbonate, barium sulfate, calcium tungstate, gadolinium oxi-sulfide, barium sulfate doped with tin dioxide zinc, antimony, elements from the lanthanide series or elements from the actinide series or blends thereof. When making a selection it is advantageous to choose an element or a compound thereof whose absorption spectrum corresponds to the absorption spectrum of said powder referred to above. The degree of fineness of the grain size spectrum of these loading materials at least corresponds to the grain size spectrum of the powder referred to above. Because of this latter powdered substance, the powder particles lose their clumping properties, and their wettability with respect to the elastomer is improved.

The powder mixture achieved in this manner is kneaded with the elastomer using an ordinary mixer such as a mixing aggregate. The work that is added during the kneading process causes the temperature of the material being blended to increase, but the temperature is held to below 180° C. Maintaining the temperature in this way is accomplished with the cooling action delivered by a suitable cooling system. The mixing work that becomes transformed into heat is transferred to the cooling system and thus disposed of. As an alternative, the number of revolutions (rpm) the mixing shaft performs can be reduced; this lowers the power input allowing for the possibility that free heat dissipation may suffice for maintaining the temperature. Subsequently the kneaded mass is removed from the mixer and allowed to pass through cooled roll mills for cooling purposes and additional homogenization. Afterwards, on a strip cutting apparatus, the mass formed in this manner is cut into strips which are then pressed through a strainer with a mesh bottom. This mesh bottom has a strainer mesh width of between 5 $\mu$m and 1000 $\mu$m; strainers with mesh widths of between 15 $\mu$m and 25 $\mu$m are preferred. After the mixture has been prepared and strained in this fashion it is further processed into foils, in particular in ways that are known in the art, and, if need be, it is vulcanized once the necessary cross-linking agents for the vulcanization process have been added. Suitable tools for further processing are additional roll mills, such as calendars, roller heads, roller dies and other appropriate roll mill apparatuses.

It is advantageous if the radiation absorbing powder contains a metal with a high atomic number, e.g. tin or compounds thereof. The proportion of tin is between 50 weight percent and 100 weight percent. If the tin part reaches 100%, the powder is lead-free thus precluding any environmental risks during manufacturing, use or recycling. Surprisingly, it was found that pre-mixing with these loading materials allows for the economical processing of the powder with the very soft and finely particled tin powder or tin compounds, in particular in connection with a special mixing procedure. For this purpose the loading materials are added, in relation to the amount of the powder, in amounts of between 0 and 50 weight percent; preferably the added loading material amount is between 2 and 20 weight percent.

Before being added to the mixing aggregate the elastomer that is used is plastified to a value of between 20 ME and 50 ME (Mooney). This "pre-plastifying process" allows the start-up of the mixer. It is also possible to break the elastomer down; this break-down is effected preferably to 10 to 100 ME (Mooney). Inside the mixer, the temperature of the mass that is to be mixed inside the mixing chamber volume is maintained at a temperature of below 180° C., preferably at between 50° C. and 140° C. The temperature is maintained by way of adjusting the coolant flow that runs through the cooling system and/or by way of adjusting the number of revolutions (rpm) the mixing shaft performs. In an advantageous further development of the invention the adjustment of the coolant flow and/or the number of rotations of the mixing shaft is effected by way of a control circuit that is coupled with a temperature probe which records the temperature of the mass that is to be mixed, and which acts upon an actuator that references the coolant flow and/or the number of revolutions the mixing shaft performs.

The mixer is of a conventional type whose mixing chamber volume can be adjusted. Reduction of the mixing chamber volume is performed until the power consumption for the mixing process increases to above the level for a no-load power consumption. Drive operation for all mixing aggregates requires power that increases from the no load power consumption up to full load. Effective mixing action can only be assured if the power consumption lies above the no-load power consumption. By reducing the volume of the mixing chamber the mass that is to be mixed is forced to stay in the area of motion of the mixing organs instead of evading them. Ordinarily the volume of the mixing chamber is reduced with a plunger that is inserted, creating a positive lock, into the mixing chamber volume until the power consumption of the mixing shaft exceeds the no load power consumption. Reduction of the mixing chamber volume is discontinued when the power consumption of the mixing aggregate has become constant; this consistency indicates that the mixing process is complete.

In a first embodied example of the method, the pre-mixed loading materials are added in successive portions. During this process, each of the successively added portions is added each time when the mixing phase for the previously added portion is complete. Depending on the mixing apparatus being used, the end of a mixing phase can be determined in accordance with the following parameters:

constancy of the power consumption of the mixing aggregate, work added to the mixing aggregate, constancy of the temperature of the mixture to be blended, duration based on experience, mixer-specific parameters based on experience.

In a second embodied example of the method the pre-mixed loading materials are added in a continual stream. The adding speed for the material is measured in such a way that the time it takes to add the material exceeds ¼ of the dwelling time of the mass inside the mixer. It is advantageous to control the adding process so that the power consumption of the mixer and temperature of the elastomer mass that is to be mixed are increasingparallel to each other. Maintaining these parameters will ensure an adding speed that will assure economical production.

The invention is explained in more detail using the subsequent method examples as illustrations. The weight percent values relate to the completed mixture.

EXAMPLE 1

For a radiation shielding material with a density of 3.71 g/cm³ and a radiation shielding factor of 2.80 mm using an elastomer on the basis of natural rubber, using tin powder, using the loading material I (alkaline earth tungstate), and the loading material II (oxide, carbonate or other inorganic compounds of elements from the lanthanide series, such as gadolinium oxide or cerium carbonate), in particular

| | |
|---|---|
| 82.0 weight percent of | tin powder |
| 0.3 weight percent of | loading material I |
| 5.0 weight percent of | loading material II |
| are mixed and respectively added to: | |
| 12.0 weight percent of | rubber (NR) |
| that is blended with | |
| 0.3 weight percent of | [fast curing] accelerator |
| 0.4 weight percent of | sulfur |

EXAMPLE 2

For a radiation shielding material with a density of 3.41 g/cm³ and a radiation shielding factor of 3.60 mm using an elastomer on the basis of natural rubber/synthetic rubber blend, using tin powder, using the loading material I (alkaline earth tungstate) and the loading material II (oxide, carbonate or other inorganic compounds of elements from the lanthanide series such as gadolinium oxide or cerium carbonate), in particular

| | |
|---|---|
| 52.0 weight percent of | tin powder |
| 28.0 weight percent of | loading material I |
| 6.5 weight percent of | loading material II |
| are mixed and added in a continual stream to | |
| 12.5 weight percent of | rubber (NR) |
| that is blended with | |
| 0.4 weight percent of | [fast curing] accelerator |
| 0.6 weight percent of | sulfur. |

EXAMPLE 3

For a radiation shielding material with a density of 3.63 g/cm³ and a radiation shielding factor of 3.00 mm using an elastomer on the basis of synthetic rubber, using tin powder, using the loading material I (alkaline earth tungstate) and the loading material II (oxide, carbonate or other inorganic compounds of elements from the lanthanide series, such as gadolinium oxide or cerium carbonate), in particular

| | |
|---|---|
| 60.0 weight percent of | tin powder |
| 6.0 weight percent of | loading material I |
| 20.0 weight percent of | loading material II |
| are mixed and added in a \continual stream to | |
| 12.5 weight percent of | rubber (NR) |
| that is blended with | |
| 0.4 weight percent of | [fast curing] accelerator |
| 0.6 weight percent of | sulfur. |

EXAMPLE 4

For a radiation shielding material with a density of 3.75 g/cm³ and a radiation shielding factor of 2.90 mm using an elastomer on the basis of styrene-ethylene-butylene-styrene, using tin powder, using the loading material I (alkaline earth tungstate) and the loading material II (oxide, carbonate or other inorganic compounds of elements from the lanthanide series, such as gadolinium oxide or cerium carbonate), in particular

| | |
|---|---|
| 84.0 weight percent of | tin powder |
| 10.0 weight percent of | loading material I |
| 6.0 weight percent of | loading material II |
| are mixed and added in a continual stream to | |
| 10.0 weight percent of | TPR (SEBS/SBS). |

The material masses that are obtained in accordance with Examples 1 to 4 are processed into foils after they were passed through a strainer. Finally, the material is fashioned into the desired ready-made aprons, capes, etc.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. Method for manufacturing a radiation shielding material from a polymer that is blended with a radiation-absorbing filler material, the polymer being an elastomer comprising a synthetic thermoplastic, vulcanizable elastomer, or a non-vulcanizing elastomer; wherein the vulcanizable elastomer is natural rubber (NR), polychloroprene (CR), nitrile-butadiene (NBR), styrene-butadiene rubber (SBR), butadiene rubber (BR), ethylene propylene terpolymer (EPM), ethylene propylene copolymer (EPM), polyurethane (PU), isobutylene-isoprene rubber, silicone rubber (VMO and MQ), ethylene vinyl acetate rubber (EVA) or blends thereof, wherein the non-vulcanizing elastomer is polypropylene/EPDM (PP/EPDM), styrene-ethylene-butylene-styrene (SEBS), polyvinyl-chloride-nitrile-butadiene (NBR/PVC), ethylene propylene copolymer (EPM), or blends thereof; the radiation absorbing filler material comprising a powder of an element with a high atomic number or compounds thereof selected from the group consisting of antimony, barium, bismuth, bromine, cadmium, cerium, cesium, gold, iodine, indium, iridium, lead, mercury, molybdenum, osminium, platinum, polonium, rhenium, rhodium, silver, strontium, tantalum, thorium, tin, tungsten, uranium, zirconium, elements from the lanthanide group and elements from the actinide group, represented by more than 80 weight percent, and having a grain size distribution in the range of 20 μm to 120 μm, the method including the steps of:

A) mixing with the filler material a loading material in powdered form so as to improve wettability of the filler material with respect to the elastomer; the loading material comprising magnesium aluminum silicate, zinc stearate, silicone resin powder, strontium carbonate, barium carbonate, barium sulfate, calcium tungstate, gadolinium oxi-sulfide, barium sulfate doped with tin dioxide, zinc, antimony, elements from the lanthanide series or elements from the actinide series or mixtures thereof, wherein the loading material is a material that is different from the filler material;

B) kneading the mixture of step A together with the elastomer inside a mixer while maintaining a temperature thereof below 180° C.;

C) removing the kneaded mixture from the mixer and passing the kneaded mixture through cooled roll mills wherein the kneaded mixture is cooled and homogenized;

D) cutting the cooled and homogenized mixture into strips on a strip cutting apparatus;

E) passing the strips through a strainer having a mesh width of between 5 $\mu$m and 1000 $\mu$m; and F) forming the strained mixture into a foil.

2. The method as claimed in claim 1, wherein step E comprises passing the strips through a strainer having a mesh width of between 15 $\mu$m and 35 $\mu$m.

3. The method as claimed in claim 1, further including the step of vulcanizing the strained mixture.

4. The method as claimed in claim 1 wherein the filler material comprises tin in an amount of between 50 and 84 percent weight.

5. The method as claimed in claim 1 wherein the loading material is in an amount of between 2 and 50 percent weight.

6. The method as claimed in claim 1 including the step of plasticizing the elastomer between 20 ME and 50 ME (Mooney) prior to step B.

7. The method as claimed in claim 6 wherein the elastomer is plasticized to between 10 ME and 100 ME (Mooney).

8. The method as claimed in claim 1 wherein the temperature inside a mixing volume of the mixer is maintained at a temperature of between 50° and 140° C. during step B.

9. The method as claimed in claim 8 wherein the temperature is maintained by adjusting a flow of cooling water to the mixer.

10. The method as claimed in claim 8, wherein the temperature is maintained by adjusting an rpm of the mixer.

11. The method as claimed in claim 1 wherein a volume of a chamber of the mixer is reduced during step B to increase a power consumption of the mixer to a level above a non-load power consumption level.

12. The method as claimed in claim 11 wherein the reduction of the mixing chamber volume is discontinued when the power consumption of the mixer becomes constant.

13. The method as claimed in claim 1 wherein the mixture of step A is added to the mixer in sequential portions in step B.

14. The method as claimed in claim 13 wherein each sequential portion of the mixture of step A is added to the mixer after a previously added portion thereof has been thoroughly mixed.

15. The method as claimed in claim 12 wherein the mixture of step A is introduced into the mixer in a continuous stream in step B.

16. The method as claimed in claim 15 wherein an introduction speed of the continuously introduced mixture is such that a time required to add the mixture exceeds one-quarter of a dwelling time of the mixture inside the mixer.

17. The method as claimed in claim 15 wherein the introduction speed is controlled in such a way that a power consumption of the mixer and the temperature increase of the elastomer in the mixer are parallel in relation to each other.

18. Method for manufacturing a radiation shielding material from a polymer that is blended with a radiation-absorbing filler material, the polymer being an elastomer selected from the group consisting of a synthetic thermoplastic, vulcanizable elastomer, and a non-vulcanizing elastomer; the vulcanizable elastomer selected from the group consisting of natural rubber (NR), polychloroprene (CR), nitrile-butadiene (NBR), styrene-butadiene rubber (SBR), butadiene rubber (BR), ethylene propylene terpolymer (EPM), ethylene propylene copolymer (EPM), polyurethane (PU), isobutylene-isoprene rubber, silicone rubber (VMO and MQ), ethylene vinyl acetate rubber (EVA) and blends thereof; the non-vulcanizing elastomer selected from the group consisting of polypropylene/EPDM (PP/EPDM), styrene-ethylene-butylene-styrene (SEBS), polyvinyl-chloride-nitrile-butadiene (NBR/PVC), ethylene propylene copolymer (EPM), and blends thereof; the radiation absorbing filler material comprising a powder of an element with a high atomic number or compounds thereof selected from the group consisting of antimony, barium, bismuth, bromine, cadmium, cerium, cesium, gold, iodine, indium, iridium, lead, mercury, molybdenum, osminium, platinum, polonium, rhenium, rhodium, silver, strontium, tantalum, thorium, tin, tungsten, uranium, zirconium, elements from the lanthanide group and elements from the actinide group, represented by more than 80 weight percent, and having a grain size distribution in the range of 20 $\mu$m to 120 $\mu$m, the method including the steps of:

A) mixing with the filler material a loading material in powdered form so as to improve wettability of the filler material with respect to the elastomer; the loading material selected from the group consisting of magnesium aluminum silicate, zinc stearate, silicone resin powder, strontium carbonate, barium carbonate, barium sulfate, calcium tungstate, gadolinium oxi-sulfide, barium sulfate doped with tin dioxide, zinc, antimony, elements from the lanthanide series and elements from the actinide series and mixtures thereof, wherein the loading material is a material that is different from the filler material;

B) kneading the mixture of step A together with the elastomer inside a mixer while maintaining a temperature thereof below 180° C.;

C) removing the kneaded mixture from the mixer and passing the kneaded mixture through cooled roll mills wherein the kneaded mixture is cooled and homogenized;

D) cutting the cooled and homogenized mixture into strips on a strip cutting apparatus;

E) passing the strips through a strainer having a mesh width of between 5 $\mu$m and 1000 $\mu$m; and F) forming the strained mixture into a foil.

19. The method of claim 1, wherein the step of mixing with the filler material a loading material in powdered form is effective to reduce clumping of the filler material.

20. The method of claim 18, wherein the step of mixing with the filler material a loading material in powdered form is effective to reduce clumping of the filler material.

* * * * *